(12) United States Patent
Pfeiffer et al.

(10) Patent No.: US 9,901,974 B2
(45) Date of Patent: Feb. 27, 2018

(54) METHOD FOR DIRECT SCREWING OF STRUCTURAL COMPONENTS, IN PARTICULAR FOR FLOW HOLE SCREWING AND DEVICE FOR DIRECT SCREWING OF STRUCTURAL COMPONENTS

(71) Applicant: DEPRAG SCHULZ GMBH u. CO., Amberg (DE)

(72) Inventors: Rolf Pfeiffer, Amberg (DE); Carsten Rosenkranz, Amberg (DE)

(73) Assignee: DEPRAG Schulz GmbH u. Co., Amberg (DE)

( * ) Notice: Subject to any disclaimer, the term of this patent is extended or adjusted under 35 U.S.C. 154(b) by 394 days.

(21) Appl. No.: 14/711,346

(22) Filed: May 13, 2015

(65) Prior Publication Data

US 2015/0328677 A1    Nov. 19, 2015

(30) Foreign Application Priority Data

May 13, 2014 (DE) .......................... 10 2014 208 989

(51) Int. Cl.
  *B25B 23/14* (2006.01)
  *B21J 5/06* (2006.01)
  (Continued)

(52) U.S. Cl.
  CPC .............. *B21J 5/066* (2013.01); *B21D 39/00* (2013.01); *B21J 15/027* (2013.01); *B21J 15/285* (2013.01);
  (Continued)

(58) Field of Classification Search
  CPC ........ B21J 5/066; B21J 15/285; B21J 15/027; B21K 25/005; B23P 19/06; F16B 25/106; F16B 25/0021; F16B 11/006; B21D 39/00; Y10T 29/5307; Y10T 29/49909
  See application file for complete search history.

(56) References Cited

U.S. PATENT DOCUMENTS 5,113,951 A    5/1992   Houben et al.
7,413,029 B2*  8/2008   Seno ................... B23P 19/065
                                              173/11
(Continued)

FOREIGN PATENT DOCUMENTS

DE    4225157 A1    2/1994
DE    68918335 T2   1/1995
(Continued)

*Primary Examiner* — Jun Yoo
(74) *Attorney, Agent, or Firm* — Laurence A. Greenberg; Werner H. Stemer; Ralph E. Locher

(57) ABSTRACT

A method for direct screwing, in particular flow hole screwing, includes producing a hole in a first stage in a structural component without cutting and forming a thread with a flow hole screw in a second stage. A feed and feed force are produced by a non-pneumatic feed drive and transmitted to a screw shaft rotated by high feed force and high rotational speed in the first stage and at a defined switchover point with penetration of the structural component a switchover is made to the second stage with lower feed force and slower rotational speed. A drive parameter correlated to the feed force, especially a motor current of an electric motor of the feed drive, is monitored and a characteristic change of this parameter is defined as switchover point. A rapid switchover with process stability is attained and damage to the flow hole screw thread is avoided.

14 Claims, 2 Drawing Sheets

(51) Int. Cl.
  *B21D 39/00* (2006.01)
  *B21J 15/02* (2006.01)
  *B23P 19/06* (2006.01)
  *F16B 25/00* (2006.01)
  *F16B 25/10* (2006.01)
  *B21K 25/00* (2006.01)
  *B21J 15/28* (2006.01)
  *F16B 11/00* (2006.01)

(52) U.S. Cl.
  CPC ............ *B21K 25/005* (2013.01); *B23P 19/06* (2013.01); *F16B 25/0021* (2013.01); *F16B 25/106* (2013.01); *F16B 11/006* (2013.01); *Y10T 29/49909* (2015.01); *Y10T 29/5307* (2015.01)

(56) References Cited

U.S. PATENT DOCUMENTS 8,347,766 B2 * 1/2013 Ota .................. B23P 19/003
  81/430
9,656,357 B2 * 5/2017 Somnitz ............. B29C 66/7212

FOREIGN PATENT DOCUMENTS

| DE | 19911308 A1 | 9/2000 |
| DE | 10348427 A1 | 5/2005 |
| DE | 102011109815 A1 | 2/2013 |
| DE | 102012215905 A1 | 5/2014 |
| WO | 2013020658 A1 | 2/2013 |

\* cited by examiner

METHOD FOR DIRECT SCREWING OF STRUCTURAL COMPONENTS, IN PARTICULAR FOR FLOW HOLE SCREWING AND DEVICE FOR DIRECT SCREWING OF STRUCTURAL COMPONENTS

BACKGROUND OF THE INVENTION

Field of the Invention

The invention relates to a method for direct screwing of structural components, in particular for flow hole screwing, in which a hole is produced in a first process stage in a structural component, and in a second process stage a thread is formed in the produced hole, and for this purpose, a feed and a feed force are produced with the aid of a feed drive and are transmitted to a screw shaft, the screw shaft is set in a rotational movement, in the first process stage a high rotational speed of the rotational movement and by using the feed drive a high feed force being set, and at a defined switchover point with penetration of the structural component for the second process stage a switchover is made to a lower feed force and a slower rotational speed. The invention also relates to a device for direct screwing of structural components, in particular for flow hole screwing, including a rotatably drivable screw shaft, which can be moved in an axial direction to exert a feed, a feed drive for generating a feed and a feed force and also for transmission thereof to the screw shaft, a control unit for controlling the flow hole screwing procedure, constructed in such a way that, in a first process stage, a high rotational speed of the screw shaft and by using the feed drive a high feed force are set and a switchover is made to a lower feed force and a slower rotational speed at a defined switchover point for a second process stage.

A method of this type for flow hole screwing can be inferred for example from DE 103 48 427 A1. In the case of flow hole screwing two structural components are screwed to one another by means of a screwing to one another without preliminary piercing. Here, in a first process stage a hole is produced in the structural component in a non-cutting manner and in a second process stage a thread is formed in the produced hole. Both process stages are performed here with a flow hole screw, with which the hole is firstly produced in a non-cutting manner and the thread is then formed. The flow hole screw is then also used, lastly, to connect the two structural components to one another via a screwed connection in a third process stage. For the flow hole screwing procedure, the flow hole screw is set here in a rotational movement and is moved in the axial direction with predefined feed force with the aid of a feed drive.

The flow hole screw usually has a conical tip. During the hole-forming procedure in the first process stage, the structural component is first heated by the flow hole screw at the intended hole position on account of a high rotational speed and also a high feed force, and is then plastically deformed. Following the hole-forming procedure, the flow hole screw infiltrates further and uses its screw thread to form the thread in the previously formed hole. For the thread-forming procedure in the second process stage, the rotational speed of the flow hole screw is usually reduced. In the first process stage, in which the structural components are plastically deformed by the heating, rotational speeds in the range from 1000 to 5000 rpm and feed or pressing forces in the range between 0.3 to 1.5 kN are achieved in accordance with DE 103 48 427 A1.

In accordance with DE 103 48 427 A1, the structural components are additionally pressed against one another during the screwing by a holding-down force, which is applied by way of example pneumatically or also by springs. In addition, a feed force acts on the flow hole screw by means of a screw spindle.

A further device for flow hole grooving is described from DE 199 11 308 A1. Here, a single tool is used, which for the hole operation is controlled to a slower feed compared with the subsequent thread forming. A pressing force is generated here by means of a coiled compression screw.

Systems available on the market are characterized in terms of the generation of the feed force by pneumatic systems, by means of which the feed force is generated pneumatically and is transmitted to the screw shaft.

Flow hole screwing is also used noticeably in the automotive industry. Here, a high cycle rate alongside high process stability is required in particular. The switchover between the first process stage of hole forming to the second process stage of thread forming has proven to be problematic in particular.

Besides flow hole screwing, a further type of direct screwing is constituted by drill screwing, in which the hole is produced in the first process stage with the aid of a drill screw by drilling, i.e. in a cutting manner, and in the second process step (similarly to flow hole screwing), a thread is then formed. Direct screwing is understood generally to mean a process in which the hole-forming procedure and the screwing procedure are performed in a common screwing procedure using a screw element also designed to generate the passage in the structural component accompanied by the forming of the thread.

BRIEF SUMMARY OF THE INVENTION

On this basis, the object of the invention is to reliably ensure at high cycle rate a direct screwing, in particular flow hole screwing, that has high process stability.

The object is achieved in accordance with the invention by a method for direct screwing, in particular for flow hole screwing, having the features described below and also by a device for direct screwing, in particular for flow hole screwing having the features described below.

In the method a hole is produced in a first process stage in a structural component with the aid of a screw element, specifically a flow hole screw or a drill screw, and in a second process stage a thread is formed in the produced hole with the aid of the flow hole screw or the drill screw. A feed and a feed force or also pressing force is generally produced for this purpose with the aid of a feed drive and is transmitted to a screw shaft. The screw element is held at the front end of the screw shaft. In the first process stage of hole forming a high rotational speed is set for the rotational movement of the screw shaft and a high feed force is set by means of the feed drive. At a defined switchover point with penetration of the structural component a switch is then made into the second process stage, and in so doing a lower feed force and a slower rotational speed are set. In order to ensure the quickest possible switchover with process stability the feed force is now generated by means of a non-pneumatic feed drive, and a drive parameter of the feed drive correlated to the feed force is also monitored and a characteristic change of the value of this drive parameter defines the switchover point from which a switch is to be made to the lower feed force and the slower rotational speed.

This embodiment is based on the consideration that the switchover is extremely time-critical, since, following completion of the hole-forming procedure, the high rotational speed (particularly in the case of flow hole forming) and also the high feed force are still present and, if these process parameters are retained, there is the risk of damaging the thread turns of the screw element, in particular of the flow hole screw, if this thus moves at high force and/or high feed rate against the structural component. This may mean ultimately that the thread is not formed or is formed only insufficiently, and on the whole that the structural component connection does not meet the required quality demands. Due to the sudden elimination of the counterforce following the penetration of the structural component, the feed rate usually rises uncontrollably. The thread of the screw element therefore often contacts the previously formed hole at high speed.

In order to ensure a reliable switchover, the feed force applied to the screw element is now monitored. For this purpose a parameter correlated at least with the feed force is detected and monitored. The parameter, in principle, may also be the feed force itself, which is thus monitored directly in this case. The parameter, however, is preferably merely a parameter correlated to the feed force, i.e. a variable that indirectly defines the feed force. An accurately defined and reliable switchover criterion is given by the at least indirect monitoring of the feed force and allows a sufficiently rapid switchover.

Here, the invention is also based on the consideration that, with the use of pneumatic feed drives, which nowadays are used conventionally, these do not allow a sufficiently rapid switchover. Due to the compressibility of the air in the case of a pneumatic drive, there is, with a pneumatic drive of this type, no possibility of a defined rapid decrease of the feed force and of the feed rate, i.e. no possibility of a sufficiently rapid switchover.

In order to determine the switchover point a switchover value of the parameter is selectively predefined, the switchover being performed once this value is reached (or undershot or overshot). Alternatively or in addition, a characteristic change of the value is used as switchover criterion.

By the solution described here, an immediate switchover at the end of the hole-forming procedure and before the start of the thread-forming procedure is therefore ensured reliably and with process stability.

The switchover is preferably performed here immediately after the penetration of the structural component and chronologically before the start of the thread-forming procedure. Damage to the thread is thus reliably eliminated. Here, use is made of the fact that, already during penetration, i.e. when the tip of the screw element exits for the first time from the underside of the structural component, there is a significant decrease in feed force. The switchover is therefore performed already at this earliest possible moment in time.

Following the switchover the 'passage' is also preferably formed, i.e. the substantially cylindrical forming of the hole is performed. This shaping of the cylindrical passage is necessary due to the usually conically tapering tip of the screw element. Only then does the thread-forming procedure begin. A partial process step is therefore integrated between the switchover and the thread forming, such that a sufficient time interval is ensured until the thread contacts the structural component surface. This ensures that the switchover procedure is terminated and the lower feed force and the slower rotational speed are already set.

In accordance with a preferred embodiment a parameter correlated to the feed force, in particular a drive parameter of the feed drive, is monitored. This embodiment is based on the consideration of monitoring a drive parameter of the feed drive, since state changes during the hole-forming procedure can be identified on this basis in a timely and also reliable manner.

The term "drive parameter correlated to feed force" is understood here in particular to mean an input-side parameter of the feed drive, which parameter is fed to the feed drive and via which the currently generated feed force is indirectly defined. Here, the input-side drive parameter is usually a characteristic for the power consumption of the drive. The parameter is therefore usually not an output-side parameter. In particular it is not constituted by variables directly characterizing the feed, specifically the generated feed force or the generated feed rate. There is thus in particular no direct force measurement of the generated feed force. State changes are identified in good time by the use of input-side parameters.

In a particularly expedient embodiment the feed drive here has an electric motor, in particular a brushless DC motor. The feed and also the feed force are thus generated via the electric motor. Compared with a pneumatic drive, an electric motor of this type has good controllability and a high switchover speed between different operating states.

Alternatively to an electric motor, a hydraulic motor for generating the feed force and the feed is used advantageously. Due to the incompressibility of the used hydraulic fluid (in contrast to a pneumatic drive), a very rapid switchover is enabled in this case as well.

In both cases a decrease of the value of a drive parameter in particular is evaluated as a characteristic change. This is based in principle on the consideration that high forces are exerted for the hole-forming procedure on account of the resistance of the structural component. The counterforce decreases relatively abruptly already as the structural components are penetrated, i.e. when the tip of the screw element pierces through the underside of the structural component, and is expressed also in a characteristic decrease of the input-side drive parameter of the feed drive. Alternatively the parameter can also be monitored on the basis of an undershoot of a predefined limit or switchover value.

As drive parameters which are to be monitored, a motor characteristic, in particular the motor current or a variable correlated to the motor current, is preferably monitored in the case of the electric motor. This parameter could also be, for example, the rotational speed or the torque of the electric motor of the feed drive.

In the case of a hydraulic motor the pressure within a hydraulic unit, via which the feed force is generated, is monitored as drive parameter.

A particular advantage with the use of an electric motor and the monitoring of the motor current is the early identification of a change of the motor current. In particular it has been found that a characteristic decrease of the motor current can be detected already at the end of the hole-forming procedure, specifically with the insertion and penetration of the flow hole screw through the structural components following completion of the heating process, this decrease of motor current thus already indicating the final penetration.

In order to reliably avoid damaging the thread following the hole-forming procedure, a maximum feed rate is predefined as limitation in an expedient embodiment for the feed drive. It is thus ensured that, independently of a switchover, the feed drive moves with a maximum speed. Even though the hole-forming procedure is thus completed and the counterforce is thus cancelled, which would usually lead to a sudden rise in speed of the feed movement, the feed drive immediately runs in a speed limitation. Here as well it is again of key importance that the drive is not a pneumatic drive, since otherwise a limitation of this type would not be possible for the intended application.

In an expedient development a maximum feed force is also predefined as limitation for the feed drive. This is significant in particular in the case of the hole-forming procedure in order to thus delimit the exerted force on the whole. In the case of the use of an electric motor for the feed drive, this is achieved by a delimitation of the current consumption of the electric motor.

This maximum feed force or also the maximum feed rate preferably can be parameterized here, i.e. they can be adjusted by the user, who for example controls the device for flow hole screwing at the production line. This adjustment is made here preferably by a software-based control. Alternatively other adjustment elements, such as adjustment buttons, etc., may also be provided.

In a particularly expedient development a switchover is performed a number of times between the first and the second process stage during a flow hole screwing procedure under defined preconditions. Here, this embodiment is based on the consideration that gaps or also intermediate layers, for example adhesive layers, are often present between the two structural components to be connected. In the case of the hole-forming procedure this ultimately causes the counterforce to decrease abruptly following the penetration of the first structural component, although the process is not complete, since the second structural component must still be penetrated. The corresponding control logic is therefore designed in such a way that it recognizes a subsequent increase of the value of the monitored parameter when the flow hole screw contacts the second structural component. In this case a switchover is again made to the high feed force and the high rotational speed.

Here, a characteristic rise of the feed force is expediently used as a further switchover point for the renewed switchover into the first process stage. For this purpose the parameter correlated to the feed force, in particular the motor current, is again preferably monitored and evaluated. On the whole, the entire process procedure is thus adaptively adjusted to a respective, present, current situation. Particular situations of this type, such as structural components connected to one another via an adhesive layer, are likewise processed reliably, with process stability and at high speed via the stored control logic.

For the generation of the rotational movement of the screw shaft, an additional screw drive is provided in an expedient embodiment and is thus arranged next to the feed drive. Here, the rotational movement of the screw shaft is generated via the screw drive and is transmitted suitably thereto. By contrast, merely the axial feed of the screw shaft and also the feed force transmitted to the screw shaft and therefore also to the screw element, in particular to the flow hole screw, is generated and transmitted via the feed drive.

The screw drive here is expediently a second electric motor, which is additionally designed for a controlled screwing procedure. The screw drive is therefore on the whole a controllable, specialized screw drive. This comprises, in a manner known per se, selectively or also in combination a torque controller, an angle of rotation controller and also various stored process algorithms so as to be able to perform different screwing and tightening methods using the same electric motor. Here, this electric motor in the screw drive again preferably can be parameterized. The drive parameters of the screw drive preferably are not monitored in terms of the switchover point. A switchover is performed via the screw drive merely between the high rotational speed during the hole-forming procedure and the low rotational speed during the thread forming. The screw drive must be monitored in particular for the third process stage, or what is known as the final tightening of the screw element, following the thread-forming procedure. In this third process stage the screw element is screwed into the previously formed thread and tightened in order to screw the two structural components. The secure fit of the screw element and therefore the end of the screwing procedure is provided in this case for example by a torque monitoring.

In an expedient embodiment a feed force of greater than 1000N and a rotational speed for the screw shaft in the range from 5000 rpm to 8000 rpm are generated during the flow hole screwing procedure in the first process stage. In the second process stage a feed force in the range of merely up to 500N and also a rotational speed in the range from approximately 500 to 2500 rpm are then expediently set.

The advantages specified with regard to the method and preferred embodiments can also be transferred analogously to the device as claimed in the invention. The device is typically an automatic device which is not hand-operated. Here, the device is a secured to a machine and in particular to a robot arm and is operated in an automated manner by the machine or the robot arm. It is therefore in particular a robot-operated system.

BRIEF DESCRIPTION OF THE SEVERAL VIEWS OF THE DRAWING

An exemplary embodiment of the invention will be explained in greater detail hereinafter with reference to the figures, in which.

DESCRIPTION OF THE INVENTION

Figure 1:
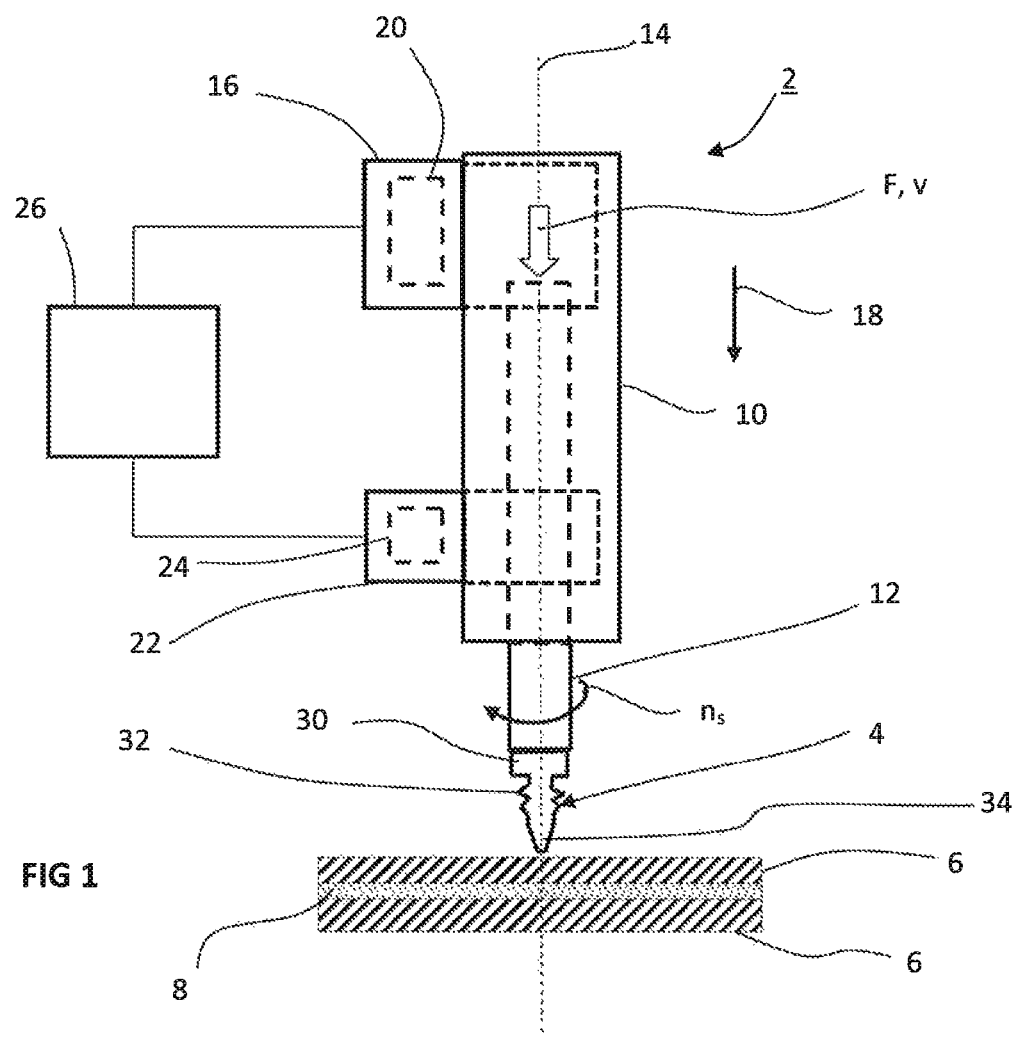
FIG. 1 shows a device for flow hole screwing in a schematic and highly simplified illustration.

The device 2 illustrated in FIG. 1 is used to carry out a flow hole screwing procedure. During this procedure what is known as a flow hole screw 4 is inserted into at least one structural component 6. In the exemplary embodiment two structural components 6 to be connected to one another via the flow hole screw 4 are illustrated and are connected to one another additionally via an adhesive layer 8.

The device 2 comprises a holder 10, which for example is formed in the manner of a housing. A screw shaft 12 is mounted rotatably about an axis of rotation 14 within the holder 10. The device 2 also comprises a feed drive 16 for generating a feed movement in the axial direction 18 and also for generating a feed force F. The feed force F and the feed movement are transmitted here to the screw shaft 12. A feed rate v is transmitted to the screw shaft 12 via the feed drive 16 and is thus used to move the screw shaft in the axial direction 18.

The feed drive 16 has a first electric motor 20, with the aid of which the feed force F and the feed rate v are generated. These drive variables are transmitted to the screw shaft 12 via suitable further drive structural components not illustrated in greater detail here.

The device 2 also comprises a screw drive 22, which sets the screw shaft 12 in rotational movement about the axis of rotation 14. Here, the screw drive 22 has a second electric motor 24, of which the output is in turn connected to the screw shaft 12 via structural components (not illustrated here in greater detail) of the screw drive 22 in order to generate the rotational movement.

The device also comprises a control unit 26 for controlling the flow hole screwing procedure. Here, the control unit 26 emits control signals to the two drives 16, 22.

In the case of the flow hole screwing procedure a hole (not illustrated here in greater detail) is formed in a first process stage I in the structural components 6. For this purpose the screw shaft 12 is driven by means of the screw drive 22 at high rotational speed $n_{s1}$. The index s stands here for the rotational speed $n_s$ of the screw shaft 12. At the same time a high feed force $F_1$ is exerted by means of the feed drive 16. This lies for example in a range above 1000N. The high rotational speed $n_{s1}$ lies in a range between 5000 rpm to 8000 rpm. Following completion of the hole-forming procedure the rotational speed $n_s$ is switched over to a slow rotational speed $n_{s2}$, which merely lies still at 1000 to 2500 rpm. At the same time a low feed force $F_2$ is set, which lies merely still in the range up to 500N. For timely recognition and rapid switchover the motor current i is monitored in the exemplary embodiment. With a characteristic change of the value of the motor current i, this is identified as the end of the hole-forming procedure and therefore as the end of the first process stage I and is used as the switchover point for the switchover.

The flow hole screw 4 is designed especially for this purpose. It has a screw head 30, an adjoining threaded shaft with thread 32 and also a usually conical tip 34 arranged at the end. Here, the tip 34 is designed in such a way that, as the hole is formed, merely a plastic deformation occurs, with no cutting procedure.

Figure 2A:
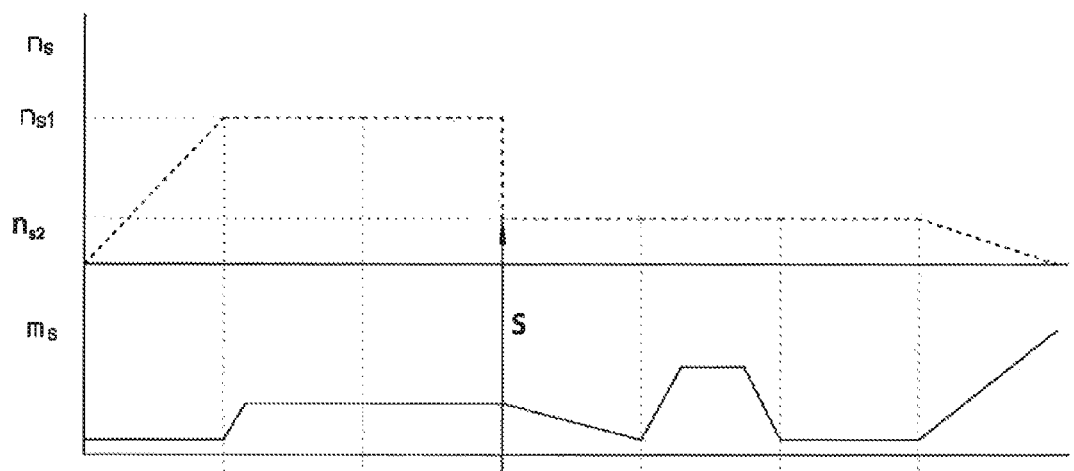
FIG. 2A shows a graph illustrating the progression of rotational speed and torque of the screw drive during the flow hole screwing procedure.
Figure 2B:
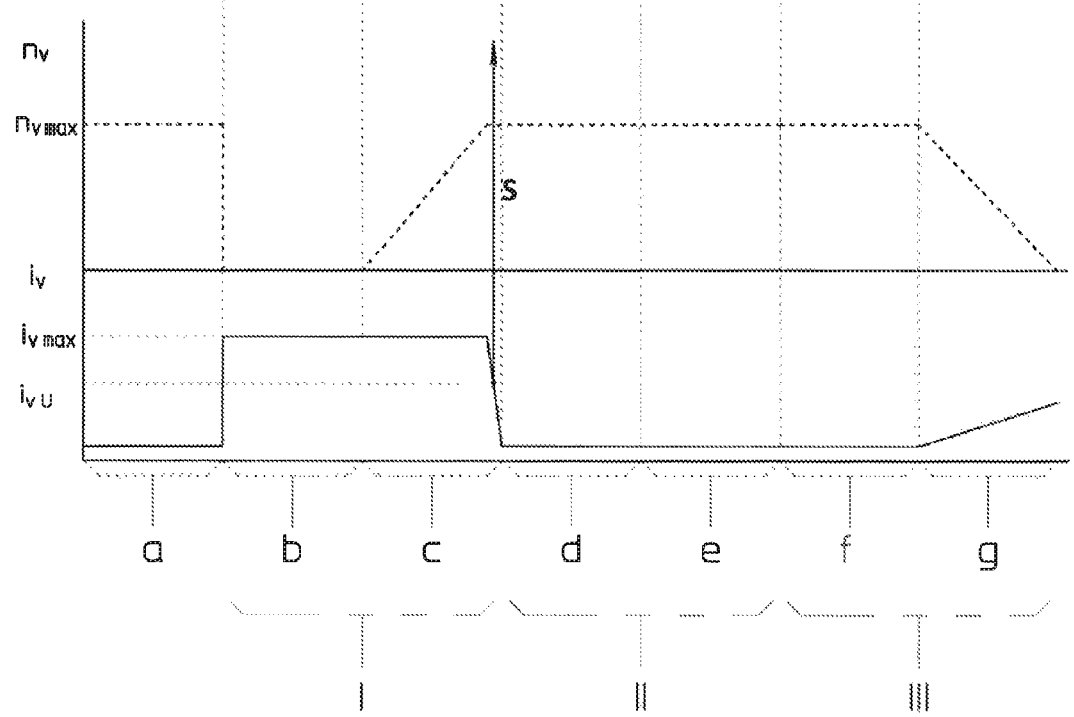
FIG. 2B shows a graph illustrating the progression of the rotational speed and the motor current of the feed drive during the flow hole screwing procedure.

The progressions of various drive parameters both of the screw drive 22 and of the feed drive 16 are illustrated in FIGS. 2A and 2B, wherein FIG. 2A specifies the drive parameters of the screw drive 22, i.e. in particular of the second electric motor 24, and FIG. 2B specifies essential drive parameters of the feed drive 16 and in particular of the first electric motor 20. The individual parameters of the feed drive 16 are provided here with the index "v" and those of the screw drive 22 are provided with the index "s". The entire flow hole screwing procedure can be divided into different sub-steps as follows:

a delivery movement
b heating
c penetration
d forming of a passage
e thread forming
f screwing in and through of the flow hole screw 4
g tightening of the flow hole screw 4

Sub-steps b and c here form the first process stage I, and sub-steps d and e form the second process stage II. The upstream sub-steps constituted by the delivery and also the downstream sub-steps constituted by screwing through and tightening are therefore additional process stages during the course of the entire flow hole screwing procedure. The sub-steps f and g here define a third process stage III of the actual screwing.

In FIG. 2A the rotational speed $n_s$ and also the torque $m_s$ of the second electric motor 24 are plotted. In FIG. 2B the progressions of the rotational speed $n_v$ and also of the motor current $i_v$ of the first electric motor 20 are plotted.

Considering first the progression of the drive parameters $n_v$, $i_v$ of the feed drive 16, the following can be seen:

During the delivery movement, the delivery and therefore the feed rate v is provided at constant rotational speed $n_v$. Since no substantial counterforces are to be overcome, the current consumption is comparatively low. As soon as the flow hole screw 4 contacts the uppermost structural component 6, the feed rate v is zero and the rotational speed $n_v$ decreases accordingly to zero. At the same time, the current consumption jumps suddenly to a maximum value $I_{vmax}$, which is stored as a current limitation. A maximum feed force Fmax is defined simultaneously via this maximum value $i_{vmax}$.

With regard to the screw drive 22, the rotational speed $n_s$ is first increased continuously to a high rotational speed $n_{s1}$, which is reached at the start of sub-step b. At the start of sub-step b, i.e. when the flow hole screw 4 sits on the structural component 6, the torque $m_s$ rises up to a constant value, on account of the resistance by the sheet metal. Here, this is a frictional resistance. The high rotational speed $n_{s1}$ and also the high feed force Fmax now lead to a heating of the structural component 6. Following sufficient heating at the end of sub-step b, the structural component 6 deforms plastically and the flow hole screw 4 infiltrates the structural component 6. A feed movement thus occurs again, such that the rotational speed $n_v$ rises continuously. During this sub-step c of penetration of the structural component 6, the motor current $i_v$ remains at a high level, and the rotational speed $n_s$ and also the torque $m_s$ likewise remain at a constant level.

Toward the end of sub-step c, a characteristic change of the motor current i then occurs, which is assessed as an indication for the final penetration. The resistance exerted by the structural component 6 thus already reduces toward the end of the penetration and drops away immediately after. The motor current $i_v$ thus decreases suddenly. This decrease is detected by the control unit 26 and evaluated. In accordance with a first variant the change of the motor current $\Delta i_v/\Delta t$ is detected here as an indication for the penetration and is evaluated. If the change $\Delta i_v/\Delta t$ exceeds a predefined threshold value, this is thus assessed as switchover criterion for the switchover into the process step II. Alternatively or also parallel hereto, a switchover value $i_{vU}$ is predefined as switchover criterion, which, once reached or undershot, prompts the switchover. The monitoring and evaluation of the motor current $i_v$ is integrated for example in the feed drive 16, in which part of the control unit 26 is thus integrated, for example.

Once the switchover criterion has been reached a switchover signal S is emitted, for example from the feed drive 16, which is transmitted to the screw drive 22, under some circumstances in a slightly delayed manner on account of signal propagation times.

The control unit 26 thus prompts a switchover of the rotational speed of the screw drive 22 to a reduced rotational speed $n_{s2}$ at a switchover point, said reduced rotational speed preferably being constant over the sub-steps d and e. In sub-step d a passage is formed by plastic deformation, i.e. a cylindrical hole is formed here. Due to the conical tip of the flow hole screw 4, there is initially not yet a cylindrical hole formed over the entire structural component thickness at the end of sub-step c immediately with penetration. This occurs only in sub-step d. In sub-step e constituted by thread forming a thread is then formed with the aid of the flow hole screw 4 in the cylindrical hole, once this has been shaped.

Due to the decreasing counterforce already in sub-step c and in addition in sub-step d, the rotational speed $n_v$ of the feed drive 16 increases initially continuously until it reaches a maximum value $n_{vmax}$ predefined by a limitation, which leads to a maximum feed rate $v_{max}$. This is thus a delimitation of the rotational speed $n_v$ to a maximum value. In the exemplary embodiment this is identical to the maximum value during the delivery movement. Alternatively however, a higher feed rate v and therefore a higher rotational speed $n_v$ may also be permitted for the delivery movement.

The rotational speed $n_v$ remains at this maximum value in the further sub-step e and also during the actual screwing-in procedure during sub-step f. Only when the flow hole screw 4 reaches what is known as head contact, in which case the screw head 30 comes to rest on the structural component 6, does the feed rate v fall again to zero, that is to say until the flow hole screw is tightened. During sub-steps d, e and f, the motor current i is typically constant and increases again only in sub-step g.

With regard to the screw drive 22 the rotational speed is held at the constant lower value $n_{s2}$ during sub-steps d to f. The rotational speed of the screw drive 22 is therefore controlled in particular, more specifically over the two process stages I and II and also in addition over sub-step f. During thread forming a higher resistance for the rotational movement again occurs, such that the torque $m_s$ rises. At the end of the thread-forming procedure the torque $m_s$ falls again to a minimal value. In the last sub-step g, in which the flow hole screw 4 is tightened, the torque $m_s$ increases again. The screwing-in procedure is controlled via the control of the screw drive 22 and is concluded once a switch-off criterion has been reached, for example once a predetermined torque has been reached. The torque progression illustrated in FIG. 2A correlates here generally to a current consumption of the screw drive 22.

The progressions described here of the various parameters are provided at least comparably also in the case of a drill screwing procedure. The characteristic progression at the transition from sub-step c to sub-step d is maintained, such that a switchover criterion can be defined in the same way.

Alternatively to the use of an electric motor 20 for the feed drive 16, a hydraulic drive can also be used in principle. In this case a characteristic change and decrease of a pressure of the hydraulic fluid, in particular a hydraulic oil, can be used as switch-off criterion. A delimitation of the feed speed is controlled for example by a hydraulic limitation of the inflow quantity of the hydraulic fluid in a corresponding cylinder. This is implemented for example via a throttle, which can be controlled with regard to the throughflow opening. The delimitation of the maximum feed force is achieved in this case by the limitation of the maximum oil pressure, for example.

In FIG. 1 the two structural components 6 are separated from one another by the adhesive layer 8. This means that, already after penetration of the first structural component 6, this is identified by the control unit 26 as switchover point. The progression is comparable to that illustrated in FIG. 2 between sub-steps c and d. There is therefore initially a switchover into process stage II, as was described previously. In this case, however, the rotational speed $n_v$ will fall again to zero following contact of the flow hole screw 4 with the second, lower structural component 6, and in addition the motor current $i_v$ will suddenly increase again. This is again identified by the control unit 26 as the start of the first process stage I and a switchover is again made into this first process stage I. In addition, the fact that this second switchover point may lie only within a predefined window, for example time interval or also path interval, is also stored here in the control unit 26. Otherwise there is an error.

| List of reference signs | |
|---|---|
| 2 | device |
| 4 | flow hole screw |
| 6 | structural component |
| 8 | adhesive layer |
| 10 | holder |
| 12 | screw shaft |
| 14 | axis of rotation |
| 16 | feed drive |
| 18 | axial direction |
| 20 | first electric motor |
| 22 | screw drive |
| 24 | second electric motor |
| 26 | control unit |
| 30 | screw head |
| 32 | thread |
| 34 | tip |
| F | feed force |
| $F_{max}$ | maximum feed force |
| V | feed rate |
| $V_{max}$ | maximum feed rate |
| $F_1$ | high feed force |
| $F_2$ | low feed force |
| $i_v$ | motor current of the first electric motor |
| $i_{vmax}$ | maximum motor current |
| $(i_{vU})$ | switchover value |
| $n_v$ | rotational speed of the first electric motor |
| $n_{vmax}$ | maximum rotational speed of the first electric motor |
| $n_v$ | rotational speed of the first electric motor |
| $n_s$ | rotational speed of the second electric motor |
| $m_s$ | torque of the second electric motor |
| $n_{s1}$ | high rotational speed of the second electric motor/the screw shaft |
| $n_{s2}$ | reduced rotational speed of the second electric motor/the screw shaft |
| S | switchover signal |

The invention claimed is:

1. A method for direct screwing or flow hole screwing of structural components, the method comprising the following steps:
producing a feed and a feed force by using a non-pneumatic feed drive and transmitting the feed and the feed force to a screw shaft;
setting the screw shaft in a rotational movement;
setting a high rotational speed of the rotational movement and setting a high feed force by using the non-pneumatic feed drive for producing a hole in a structural component in a first process stage;
switching over to a lower feed force and a slower rotational speed at a defined switchover point with penetration of the structural component for forming a thread in the hole in a second process stage; and
monitoring a parameter correlated at least with the feed force and using a characteristic value or a characteristic change of a value of the parameter to define the switchover point.

2. The method according to claim 1, which further comprises carrying out the switchover immediately with penetration of the structural component and before starting formation of the thread.

3. The method according to claim 1, which further comprises following the switchover, forming a cylindrical passage in a sub-step before the thread is formed.

4. The method according to claim 1, which further comprises defining the parameter as a drive parameter of the feed drive.

5. The method according to claim 1, which further comprises providing the feed drive with a first electric motor.

6. The method according to claim 5, which further comprises monitoring a motor characteristic as the parameter.

7. The method according to claim 6, which further comprises monitoring the motor current of the first electric motor as the parameter.

8. The method according to claim 1, which further comprises predefining a maximum feed rate as a limitation for the feed drive.

9. The method according to claim 1, which further comprises predefining a maximum feed force as a limitation for the feed drive.

10. The method according to claim 8, which further comprises:
   predefining a maximum feed force as a limitation for the feed drive; and
   parameterizing at least one of the maximum feed force or the maximum feed rate.

11. The method according to claim 1, which further comprises carrying out a switchover automatically a number of times between the first process stage and the second process stage under predefined conditions during a flow hole screwing procedure.

12. The method according to claim 11, which further comprises:
   defining a further switchover point with a characteristic rise of the feed force in the second process stage; and
   switching over again into the first process stage with the high feed force.

13. The method according to claim 1, which further comprises setting the screw shaft into the rotational movement by using an additional screw drive having a second electric motor with a controller for a controlled screwing procedure.

14. The method according to claim 1, which further comprises:
   generating a feed force of greater than 1000N and a rotational speed for the screw shaft in a range of from 5000 rpm to 8000 rpm in the first process stage; and
   setting a feed force in a range of up to 500N and also a rotational speed in a range of from 500 to 2500 rpm in the second process stage.

* * * * *